United States Patent [19]

Kirschenbaum

[11] Patent Number: 4,538,782
[45] Date of Patent: Sep. 3, 1985

[54] ELECTRICAL CABLE SUPPORTING CLAMP

[75] Inventor: Bernard Kirschenbaum, Denver, Colo.

[73] Assignee: AT&T Information Systems Inc., Holmdel, N.J.

[21] Appl. No.: 496,305

[22] Filed: May 19, 1983

[51] Int. Cl.³ .............................................. F16B 2/20
[52] U.S. Cl. ................................... 248/68.1; 174/171; 174/175
[58] Field of Search ............ 248/68 R, 74.1, 72, 248/74.3, 68.1; 24/563, 543, 17 AP, 30.5 P, 545, 169, 22; 339/176 MF, 17 M; 174/171, 175

[56] References Cited

U.S. PATENT DOCUMENTS

| 1,319,997 | 10/1919 | Galloway | 24/563 |
|---|---|---|---|
| 1,641,004 | 8/1927 | Mahoney | 24/563 |
| 3,036,801 | 5/1962 | Cemasko | 248/72 |
| 3,228,640 | 1/1966 | Wolsh | 248/72 |
| 3,253,084 | 5/1966 | Taylor | 174/52 |
| 3,778,537 | 12/1973 | Miller | 248/72 |
| 3,809,349 | 5/1974 | Baedke | 248/55 |
| 4,036,368 | 7/1977 | Munsch | 211/60 |
| 4,135,668 | 1/1979 | Winkler | 248/87 |

FOREIGN PATENT DOCUMENTS 216712  5/1958  Australia ................... 174/175

Primary Examiner—Ramon S. Britts
Assistant Examiner—Alvin Chin-Shue
Attorney, Agent, or Firm—Peter Visserman

[57] ABSTRACT

A cable supporting clamp (10) for the orderly routing of flat electrical cables (28, 29, 30) at the interconnection side of electrical equipment frames. A pair of jaws each formed of a pair of arms (18-19; 20-21) extending from one side of a backplate (15) define slots (22, 23) adapted to receive the cable or cables. The cables are trapped in the slots by a pair of nubs (24-25; 26-27) at each jaw extending inwardly into the slots at the ends of the jaw arms (18-19; 20-21). Bracket means (31, 35) are provided at the other side of the backplate (15) for slidably mounting the clamp (10) on a frame cross-member (11).

1 Claim, 1 Drawing Figure

U.S. Patent  Sep. 3, 1985  4,538,782
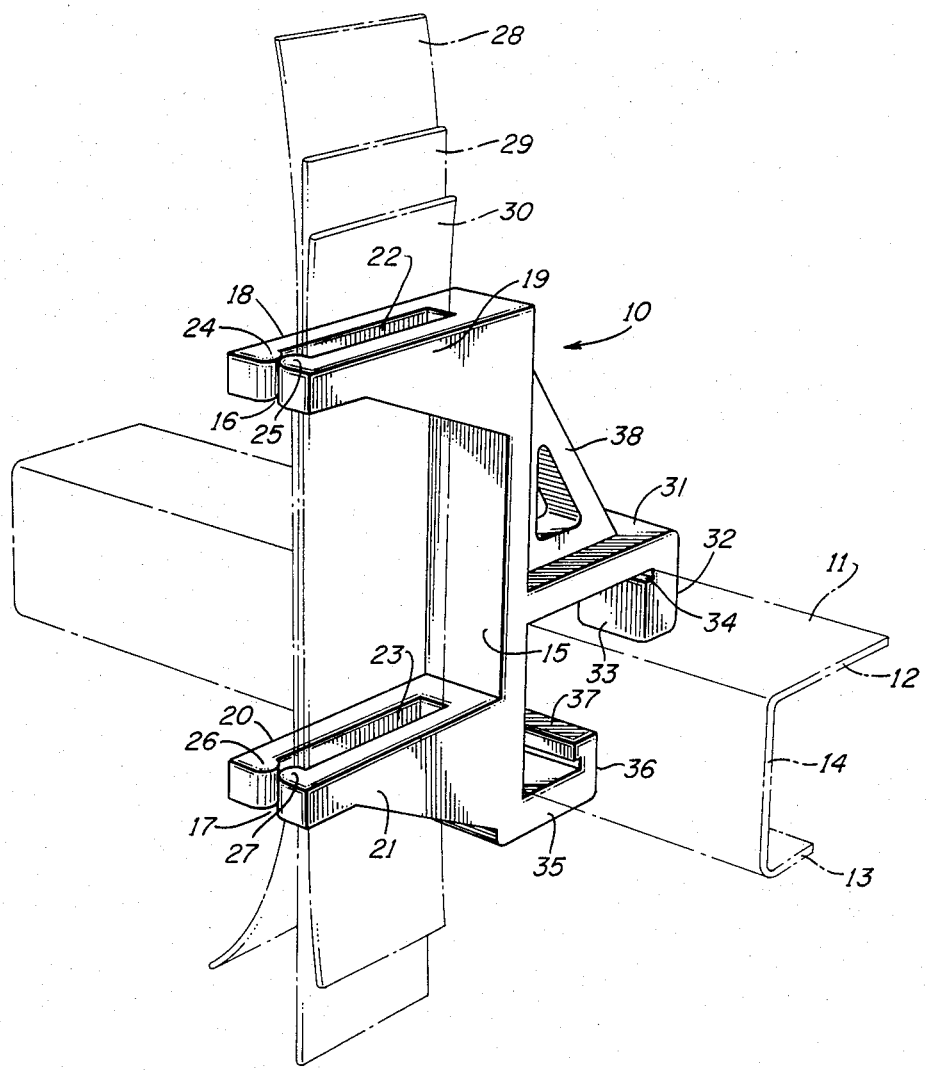

ELECTRICAL CABLE SUPPORTING CLAMP

TECHNICAL FIELD

This invention relates to electrical interconnection systems and particularly to cabling arrangements employed in such systems.

BACKGROUND OF THE INVENTION

The packaging of electrical circuit components on circuit boards and modules has made possible the orderly mounting of large numbers of such assemblies in equipment frames or cabinets. With the increased miniaturization of individual components, an even greater density of the components and circuits is achieved within the mounting structures. Although advantages in terms of space and cost savings, for example, the increased capacity of the mounting frames has also increased the amount of wiring required for interconnecting the circuit assemblies with each other and external, associated circuit assemblies. A typical such interconnection arrangement provides for the wiring to connect the ends of arrays of terminal pins extending from one side of a backplane, the other end of the pins being connected to the circuit assemblies by well-known connectors. It will be appreciated that, with all the possible connections among densely packed pins, the external wiring may become extremely complex. To achieve some order in the distribution of the wiring, in the past, conductors and cables sharing a common routing have frequently been assembled together and so maintained by means of tie wraps, tape, string, and the like. This manner of bunching of conductors or cables is obviously cumbersome and time consuming and is of limited routing flexibility. When the cables take the form of flat tapes or ribbons, their orderly routing becomes even more difficult. It is thus the problem of providing a simple means for achieving an orderly routing of conductors and cables for interconnecting circuit assemblies within and between electrical equipment mounting frames and cabinets to which the apparatus of the present invention is chiefly directed.

SUMMARY OF THE INVENTION

The orderly routing of interconnecting cables such as flat ribbon cables, for example, in accordance with the principles of the invention is achieved in one illustrative embodiment thereof comprising a supporting clamp slidably mounted on a typical cross-member of an equipment mounting frame or cabinet. The clamp comprises a backplate from which extend at each end a pair of jaws defining slots adapted to receive and clasp a cable or cables. Cables are inserted into the open end of the slots where they are trapped by a pair of nubs extending from the jaw ends inwardly into the slots. Bracket means are provided at the other side of the backplate for slidably mounting the clamp on a typical inverted "L"-shaped cross-member. Advantageously, a clamp or plurality of clamps may be so mounted anywhere cross the rear of an equipment frame and may be moved as the cable routing demands. The clamp may also be readily removed from frame cross-members are reinstalled on others as required by the cable routing.

BRIEF DESCRIPTION OF THE DRAWING

The organization and operation of one illustrative cable routing clamp according to the principles of the invention will be better understood from a consideration of the detailed description of one illustrative embodiment thereof which follows when taken in conjunction with the single FIGURE of the drawing which shows in perspective view a single illustrative cable routing clamp mounted on a typical equipment frame cross-member shown in phantom outline.

DETAILED DESCRIPTION

An illustrative cable supporting clamp 10 according to the invention is shown in the single FIGURE of the drawing as mounted on a typical equipment frame cross-member 11 a portion of which is shown in phantom outline. Cross-member 11 may be of various cross-sections; for purposes of illustration, cross-member 11 is here of inverted "L" cross-section presenting a flange 12 and an opposite, narrower flange 13, both of which extend from a base section 14. Clamp 10 comprises a backplate 15 from which at one side at opposite ends outwardly extend a pair of jaws 16 and 17. Jaws 16 and 17 are formed of pairs of arms 18 and 19 and 20 and 21, respectively, which define a pair of slots 22 and 23 therebetween. Each of arms 18 and 19 and 20 and 21 have at their ends nubs 24 and 25 and 26 and 27 formed thereon to oppositely extend into slots 22 and 23, respectively. Slots 22 and 23 are dimensioned in length to receive typical flat electrical cables and in width to receive one or more of such cables 28, 29, 30, portions of which are shown so fitted in phantom outline in the drawing. Bracket means at the other side of backplate 15 provide for the mounting of clamp 10 on cross-member 11. Extending from the other side of backplate 15 at approximately its midpoint is an arm 31 having at its end a downwardly directed lip 32 which in turn is provided at its end with an inwardly directed catch 33. A slot 34 thus presented between arm 31 and catch 33 is adapted to slidably clasp the edge of flange 12 of cross-member 11. Similarly, extending from the same side of backplate 15 at its lower end is an arm 35 having at its end an upwardly directed lip 36 which in turn is provided at its end with an inwardly direct catch 37. A slot 38 thus presented between arm 35 and catch 37 is adapted to slidably clasp the edge of flange 13 of cross-member 11. Clamp 10, which may be fabricated of any slightly deformable plastic material, may also be provided with a brace 38 between backplate 15 and arm 31 to prevent the breaking-off of the latter element during installation of clamp 10 or its subsequent use. In practice, one or more of the clamps according to the invention are snapped about cross-members of the equipment frames and then slid into position along the latter members as determined by the required cable routing. The cable or cables to be routed are then forced between nubs 24 and 25 and 26 and 27 which, as a result, slightly forces apart arms 18 and 19 and 20 and 21 to permit entry of the cables into slots 22 and 23. When so fitted, the cable or cables are trapped by the again closed nubs 24 and 25 and 26 and 27 thereby preventing their inadvertent removal from the clamp jaws. It will be appreciated that, although a particular cross-member cross-section was selected for purposes of illustration clamp arms 31 and 35 may be formed in other configurations and adapted to clasp other and different cross-member cross-sections.

What has been described is considered to be one specific illustrative cable supporting clamp according to the principles of the invention. Accordingly, it is to be understood that various and numerous other arrangements may be devised by one skilled in the art without departing from the spirit and scope of the invention as limited only by the accompanying claims.

What is claimed is:

1. A clamp for supporting a plurality of flat electrical cables in a predetermined orientation, adapted for mounting on a cross-member of an electrical interconnection frame extending in a direction perpendicular to said predetermined orientation; said clamp comprising a backplate extending in a direction parallel to said predetermined orientation, a pair of cable jaws extending from opposite ends of one side of said backplate in a direction perpendicular to said backplate, each of said jaws comprising a pair of aligned spaced-apart arms defining an elongated substantially rectangular slot having the longer dimension perpendicular to said backplate, for loosely holding said plurality of flat electrical cables, each of said arms having a nub on one end inwardly directed into said slot for admitting and trapping said cables, and bracket means extending from the other side of said backplate for slidably mounting said clamp on said cross-member, said bracket means comprising first and second parallel arms extending from said backplate in a direction opposite to said cable jaws, each arm of said bracket having a lip at its end extending toward the other arm of said bracket and a catch extending from said lip toward said backplate for clasping said cross-member.

* * * * *